US005619633A

United States Patent [19]
Turner

[11] Patent Number: 5,619,633
[45] Date of Patent: Apr. 8, 1997

[54] COMPUTER GENERATED SCRIBBLE FILL OF A VECTOR GRAPHIC

[75] Inventor: John B. Turner, Mountain View, Calif.

[73] Assignee: Apple Computer, Inc., Cupertino, Calif.

[21] Appl. No.: 356,450

[22] Filed: Dec. 14, 1994

[51] Int. Cl.$^6$ .................................................. G06T 11/40
[52] U.S. Cl. ........................................ 395/141; 395/167
[58] Field of Search ............................... 395/141, 133, 395/135, 144, 147, 150, 151, 162; 382/257–259, 308

[56] References Cited

U.S. PATENT DOCUMENTS 5,307,451  4/1994  Clark ................................. 395/133 X
5,386,510  1/1995  Jacobs .............................. 395/162 X

OTHER PUBLICATIONS

Kvern (1991).

Primary Examiner—Almis R. Jankus
Attorney, Agent, or Firm—Carr, DeFilippo & Ferrell LLP

[57] ABSTRACT

A method and apparatus read an existing computer vector shape and modify that vector shape to be scribble filled. The method includes the steps of receiving data defining a vector shape, creating a series of intersection lines overlaying the vector shape, generating intersection points that indicate where the intersection lines and the vector shape intersect, connecting by lines the intersection points at consecutive intersection line locations, and verifying that all the connecting lines are located within a boundary defined by the vector shape.

21 Claims, 8 Drawing Sheets

COMPUTER GENERATED SCRIBBLE FILL OF A VECTOR GRAPHIC

BACKGROUND OF THE INVENTION

1. Field of the Invention

The present invention relates generally to graphics generated on a computer. More particularly, the present invention relates to modification of existing computer line graphics. Specifically, the present invention relates to an apparatus and method for modifying computer generated vector graphics to have a more humanistic appearance.

2. Description of Related Art

Computer graphics can be divided into two broad categories, raster and vector. These categories differ primarily in the manner that drawing data is created, stored, and edited. Raster graphics, often called bitmaps, are two dimensional arrays of picture elements. Similar to grains in a photograph, each picture element (pixel) has a color value. The collection of these pixels and their corresponding values form a raster image.

In contrast, vector graphics are based on a definition of geometric shapes. Shapes are defined by precise mathematically defined Cartesian points. Thus, the shapes may be lines, rectangles, curves, or any arbitrary polygon defined by mathematical points. The collection of these geometric shapes and their mathematical definitions form a computer vector drawing.

Shapes in a vector drawing are divided up into strokes and fills. Strokes indicate that a vector shape should be drawn with a constant width of pixels of some color value. Fills indicate that the boundary of a shape should be closed and the interior filled with pixels of some color value. Strokes and fills that share the same shape differ in the method by which a shape is rendered.

A long-standing goal in computer graphics has been to enable computer users to produce output that does not look computer generated. The very strength of computer graphics, that is, the exact definition of an image or drawing, has been a liability because humans do not draw with such perfection. Consequently, most graphics generated on a computer look artificial.

When using raster graphics, the problem of the artificial appearance of drawings can be corrected somewhat by using digital filters. The color value of each pixel within a raster image is modified algorithmically by a digital filter. The filtering algorithms, originally based on photographic image processing, can get very complex and can provide interesting "painting" effects. Raster digital filters can modify raster images and create such appearances as watercolor or oil painting.

Unfortunately, the effects available to raster graphics do not apply to vector graphics. The analogy again is the difference between photographs and mathematical graphs. A computer user working with the desirable preciseness of vectors graphics must forfeit the pleasure of automatically producing a vector that could appear hand drawn.

Therefore, there is a strong desire for a system that would enable a computer draftsman to benefit from the preciseness offered by vector graphics, but also be able to simply and easily produce more humanistic appearing drawings.

SUMMARY OF THE INVENTION

The present invention overcomes the limitations and shortcomings of the prior art and provides creative transformations of existing vector generated images into more humanistic drawings. The apparatus of the present invention includes a central processing unit (CPU) connected to a display device, an input device, a memory, and a data storage device. The memory contains an operating system, display routines, a vector shape database, parallel intersection lines, a two dimensional array of intersection points, a list of scribble strokes, scribble fill control variables, and scribble fill routines. The scribble fill routines control the application of replacing a vector fill shape with a series of scribble strokes. Scribble fill control variables are set to control the modifications performed by the scribble fill routines, and the scribble fill control variables encompass a wide range of possible outcomes when applying the scribble fill routines.

The present invention includes a method for reading an existing computer vector shape and modifying that shape to be scribble filled. The preferred method of the present invention includes the steps of receiving geometric data points of the vector shape, creating a series of parallel intersection lines overlaying the vector shape, generating intersection points that indicate where the parallel intersection lines and the vector shape intersect, forming scribbles by connecting the parallel intersection points at vertically alternating locations with connecting lines that lie within the boundary defined by the vector shape.

DETAILED DESCRIPTION OF THE PREFERRED EMBODIMENTS

The present invention provides a method and apparatus for scribble filling a computer generated vector graphic. Data points of a vector shape are received by the apparatus of the present invention, and the invention then modifies the original vector shape to produce a graphic comprising a scribble fill. The method of the present invention includes control variables that determine how various aspects of the vector shape are to be modified.

Figure 1A:
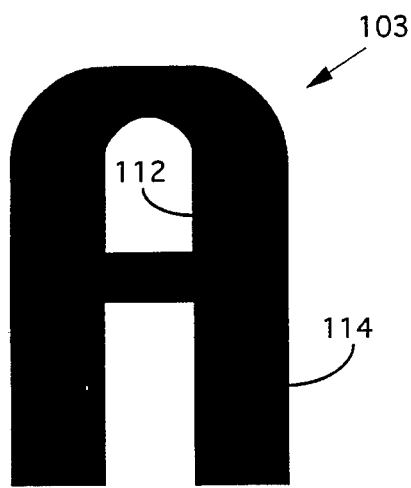
FIG. 1A illustrates a vector fill shape before being modified by the present invention.

Referring now to FIGS. 1A–1K, an overview of the various intermittent steps for modifying a vector shape in accordance with the scribble fill method of the present invention is shown. Referring first to FIG. 1A, an example of a vector fill shape 103, a graphic representation of the letter "A", that contains two contours 112 and 114 is illustrated. A contour is defined as a separate, continuous, collection of geometric points. Several contours may be combined to define a vector shape. With reference to shape 103, contour 112 defines an interior contour and contour 114 defines an exterior contour. Contours 112 and 114 combine to form the original black filled vector shape 103.

Figure 1B:
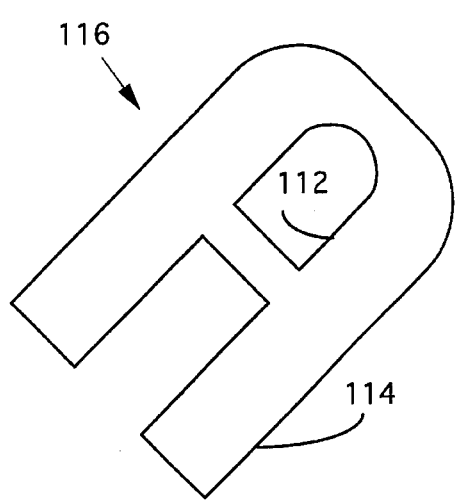
FIG. 1B illustrates an intermittent step of modifying a vector graphic in FIG. 1A in accordance with the present invention.

Referring to FIG. 1B, vector shape 116 is illustrated after vector shape 103 is rotated about its center to an angle determined by a scribble angle control variable. The angle of rotation determines the angle of the scribble fills to be generated. In the example illustrated in FIG. 1B, the scribble angle control variable is set to a value of 45°.

Figure 1C:
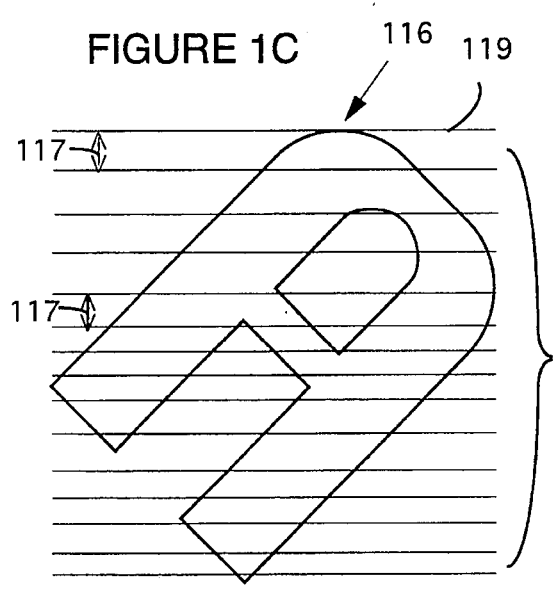
FIG. 1C illustrates an intermittent step of modifying the vector graphic in FIG. 1B in accordance with the present invention.

Referring to FIG. 1C, a series of parallel and horizontal intersection lines 118 generated upon the rotated vector shape 116 is illustrated. The horizontal intersection lines 118 are generated to intersect the vector shape 116 and create intersection points 120. The horizontal intersection lines 118 are spaced apart in accordance with a scribble frequency control variable. The scribble frequency control variable is adjusted by a scribble variance control variable that varies a gap 117 between horizontal intersection lines 118. The size of the gap 117 between different horizontal intersection lines 118 is not consistent, and the inconsistency of the gaps 117 is controlled by the scribble frequency variance control variable that modifies the scribble frequency as each gap 117 is calculated.

Figure 1D:
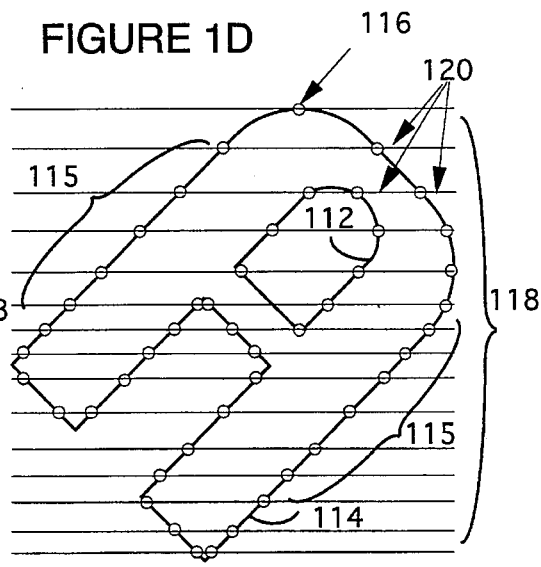
FIG. 1D illustrates an intermittent step of modifying the vector graphic in FIG. 1C in accordance with the present invention.

Referring to FIG. 1D, a two dimensional array 115 of intersection points 120 is illustrated. The array 115 is generated by intersecting the rotated vector shape 116 with the horizontal intersection lines 118. The intersection points 120 are found along both vector shape contours 112 and 114.

Figure 1E:
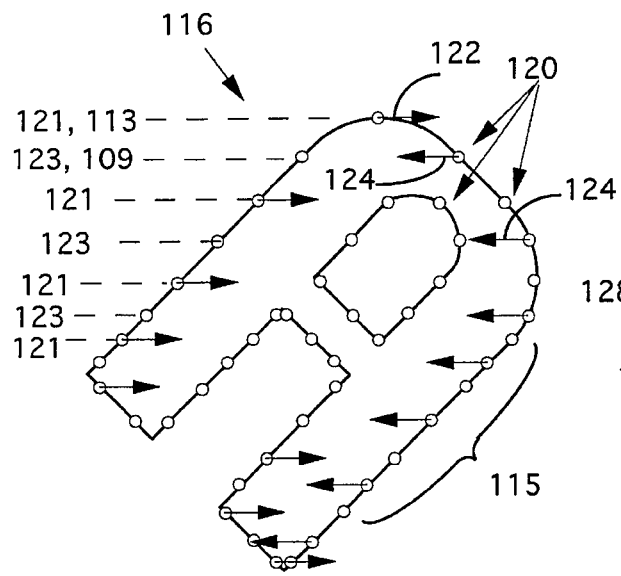
FIG. 1E illustrates an intermittent step of modifying the vector graphic in FIG. 1D in accordance with the present invention.

Referring to FIG. 1E, the ordering of each row 121,123 within the two dimensional array 115 of intersection points 120 is illustrated. The odd rows 121 have intersection points 120 ordered from left to right as indicated by the direction arrows 122. The even rows 123 have intersection points 1.20 ordered from right to left as indicated by the direction arrows 124.

Figure 1F:
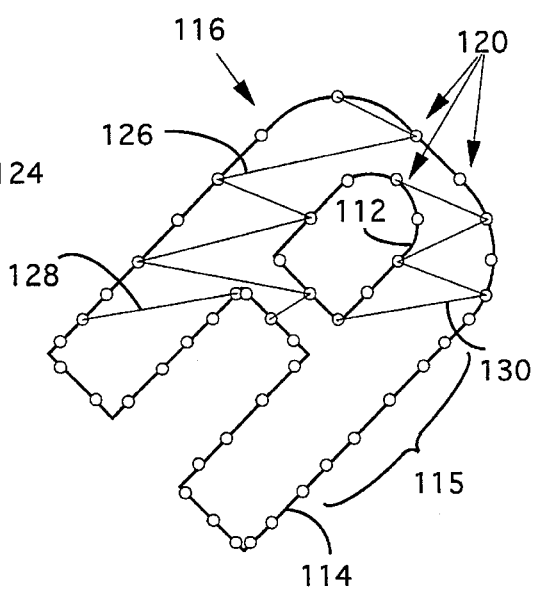
FIG. 1F illustrates an intermittent step of modifying the vector graphic in FIG. 1E in accordance with the present invention.

Referring to FIG. 1F, the initial generation of three lines or scribble strokes 126,128,130 produced from the rotated vector shape 116 and the array 115 of intersection points 120 is illustrated. The scribble strokes 126,128,130 are inside the vector shape 116 as defined by the contours 112 and 114.

Figure 1G:
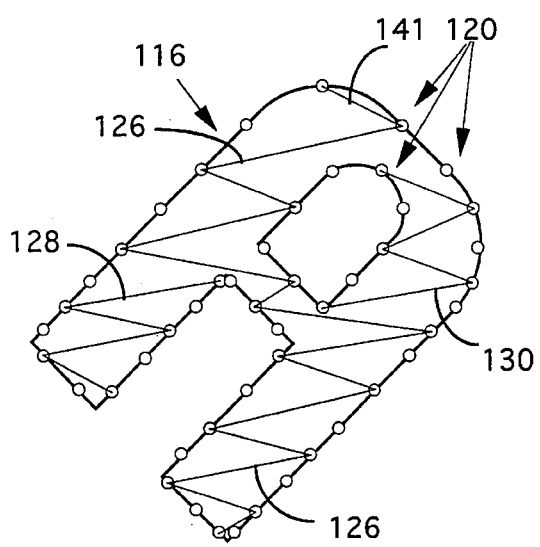
FIG. 1G illustrates an intermittent step of modifying the vector graphic in FIG. 1F in accordance with the present invention.

Referring to FIG. 1G, continued generation of the three scribble strokes 126,128,130 produced from the rotated vector shape 116 and the array 115 of intersection points 120 is illustrated.

Figure 1H:
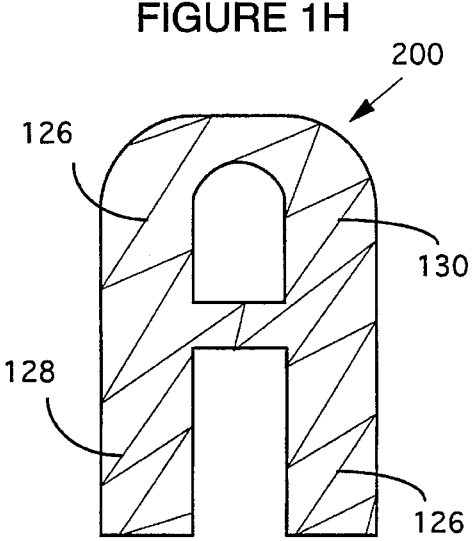
FIG. 1H illustrates an intermittent step of modifying the vector graphic in FIG. 1G in accordance with the present invention.

Referring to FIG. 1H, the unrotated vector shape 200 and the rotated final three scribble strokes 126,128,130 are illustrated. This is accomplished by rotating the vector shape 116 with the scribble strokes 126,128,130 by a negative of the scribble angle control variable, which is −45° in this example.

Figure 1I:
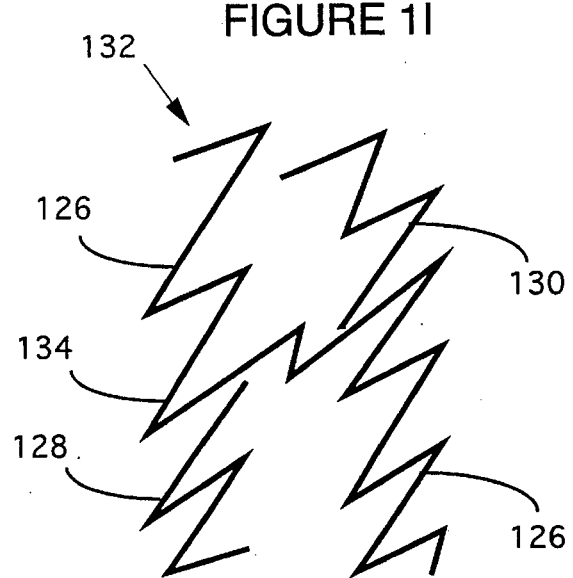
FIG. 1I illustrates a final resulting vector graphic following the sequence illustrated in FIGS. 1A–1H of the present invention.

Referring to FIG. 1I, a final compound shape or group shape 132 generated for this example by the method of the present invention is illustrated. The components of this shape 132 include the three scribble stroke 126, 128, 130, and an unseen backdrop fill shape 134 that matches a background color.

Figure 1J:
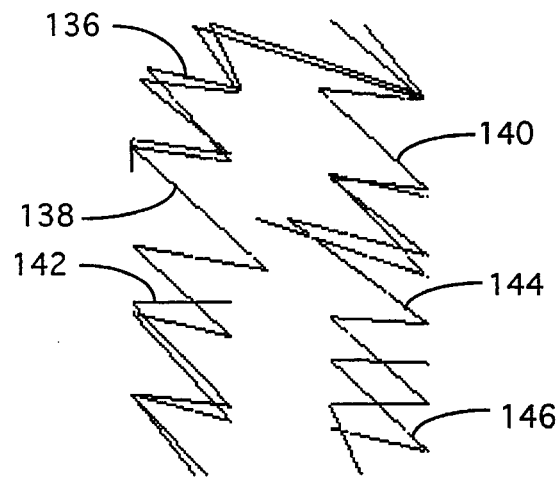
FIG. 1J illustrates an example of another resulting variation upon the original vector graphic 1A generated with different control variables of the present invention.

Referring to FIG. 1J, another embodiment of the present invention upon the original vector fill shape 103 is illustrated. The greater number of scribble strokes 136,138,140, 142,144,146 in FIG. 1J is generated by more than one repetition of the method using a repetition control variable. Application of the repetition control variable allows the scribble frequency variance and scribble angle variance control variables to generate the disparate scribble strokes 136,138,140,142,144,146.

Figure 1K:
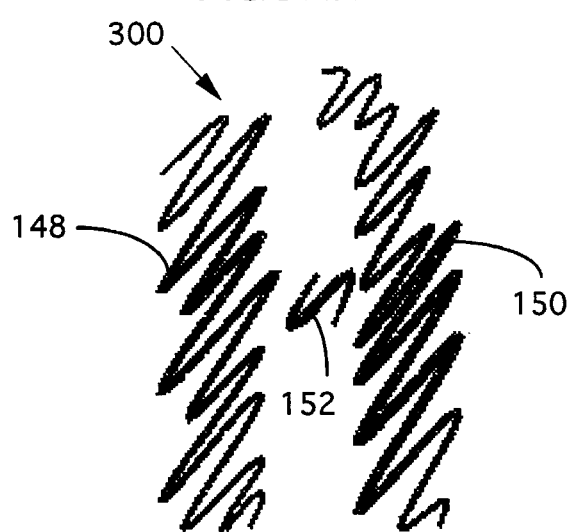
FIG. 1K illustrates a further resulting modification of the vector graphic 1A generated with different control variables in combination with other vector modification routines.

Referring to FIG. 1K, a vector fill shape 300 is illustrated with a different control variables. The resulting scribble strokes 148,150,152 are shown to be modifiable by other vector modification routines.

Figure 2:
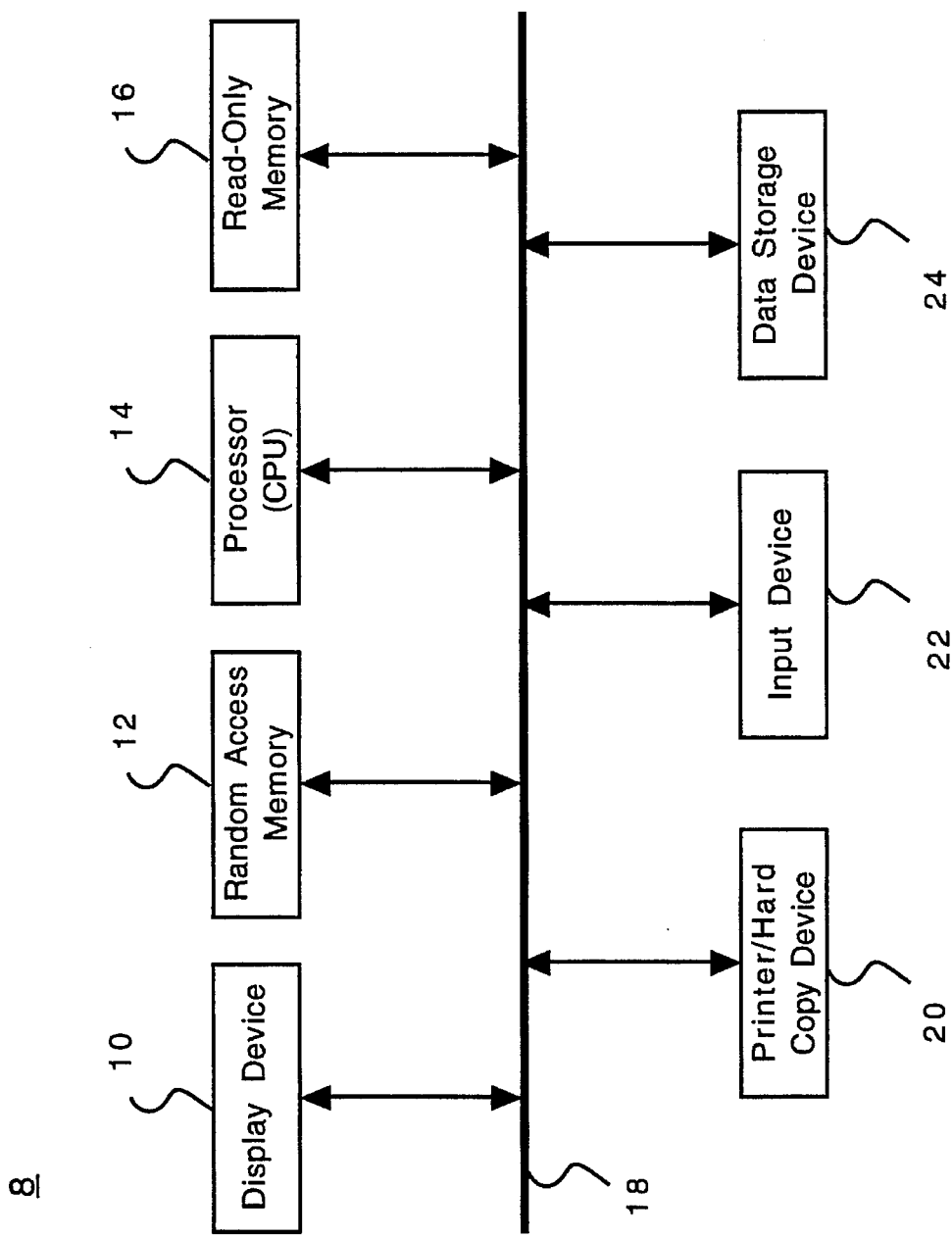
FIG. 2 is a block diagram of a computer system incorporating a preferred embodiment of the present invention.

Referring now to FIG. 2, a block diagram is illustrated of a preferred embodiment of a graphics generation and manipulation system 8 constructed in accordance with the present invention and capable of implementing the preferred method of the present invention. The graphics generation and manipulation system 8 includes a display device 10, a random access memory (RAM) 12, a central processing unit (CPU) 14, a read-only memory (ROM) 16, a printer/hard copy device 20, an input device 22, and a data storage device 24. The central processing unit (CPU) 14, display device 10, input device 22, random access memory (RAM) 12, and read-only memory (ROM) 16 are coupled in avon Neuman architecture via bus 18 such as in a personal computer.

The CPU 14 is preferably a microprocessor such as a Motorola 68040, IBM PowerPC 601, Intel 80486, or Intel Pentium®. The display device 10 is preferably a video monitor, and the input device 22 is preferably a keyboard and/or mouse type controller. The CPU 14 is also coupled to the printer/hard copy device 20 such as a laser printer in a conventional manner. The data storage device 24 is a disk drive.

The system 8 can be implemented on various computer systems, including Apple Macintosh® and IBM PC type computers. The CPU 14, under the guidance of instructions received from the RAM 12, ROM 16, and from the user through the input device 22, provides signals to be displayed on the display device 10.

Figure 3:
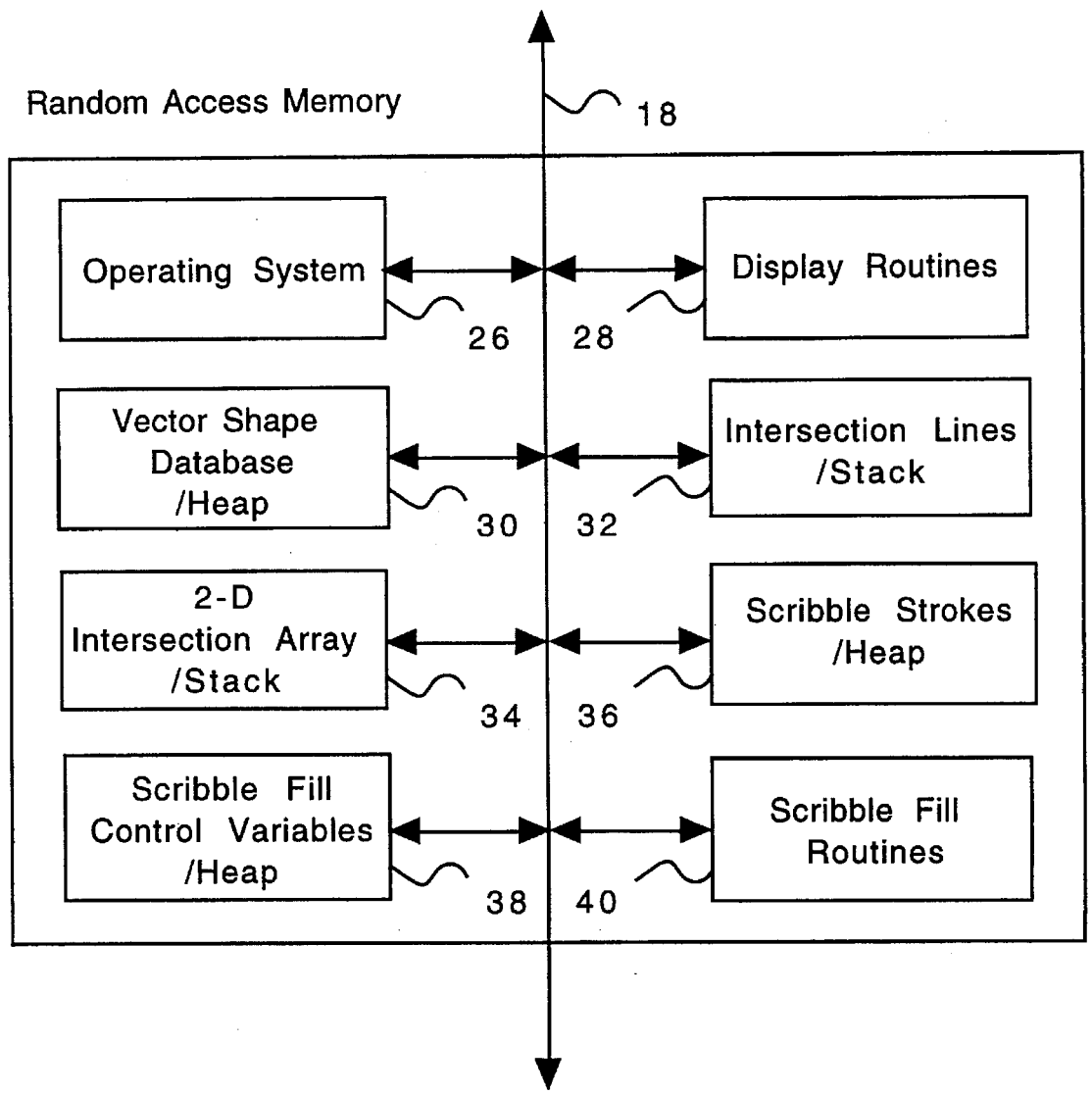
FIG. 3 is a block diagram of the random access memory (RAM) in FIG. 2.

Referring now to FIG. 3, a preferred embodiment of the RAM 12 is illustrated that includes memory space allocation for a conventional operating system 26, conventional graphics display routines 28, and a conventional vector shape database 30. The memory location for graphics display routines 28 stores a conventional routine for displaying vector shape data on the display device 10. The memory location for vector shape database 30 stores the vector shape points and associated data for all of the shapes to be modified.

In accordance with the present invention, the RAM 12 further includes memory locations for storing parallel and horizontal lines intersection 32, a two dimensional intersection array 34, a list of generated scribble strokes 36, scribble fill control variables 38 and scribble fill routines 40. The memory location for scribble fill routines 40 contains the computer instructions necessary for modifying a vector shape 103 in the manner designated by the scribble fill control variables memory 38 of the present invention. The intersection lines memory 32 stores the parallel and horizontal intersection lines 118 data of the present invention. The two dimensional intersection array memory 34 stores the points of intersection between the horizontal intersection lines 118 and the vector shape 116. The memory 38, which stores the scribble fill control variables, is illustrated in detail in FIG. 4.

Figure 4:
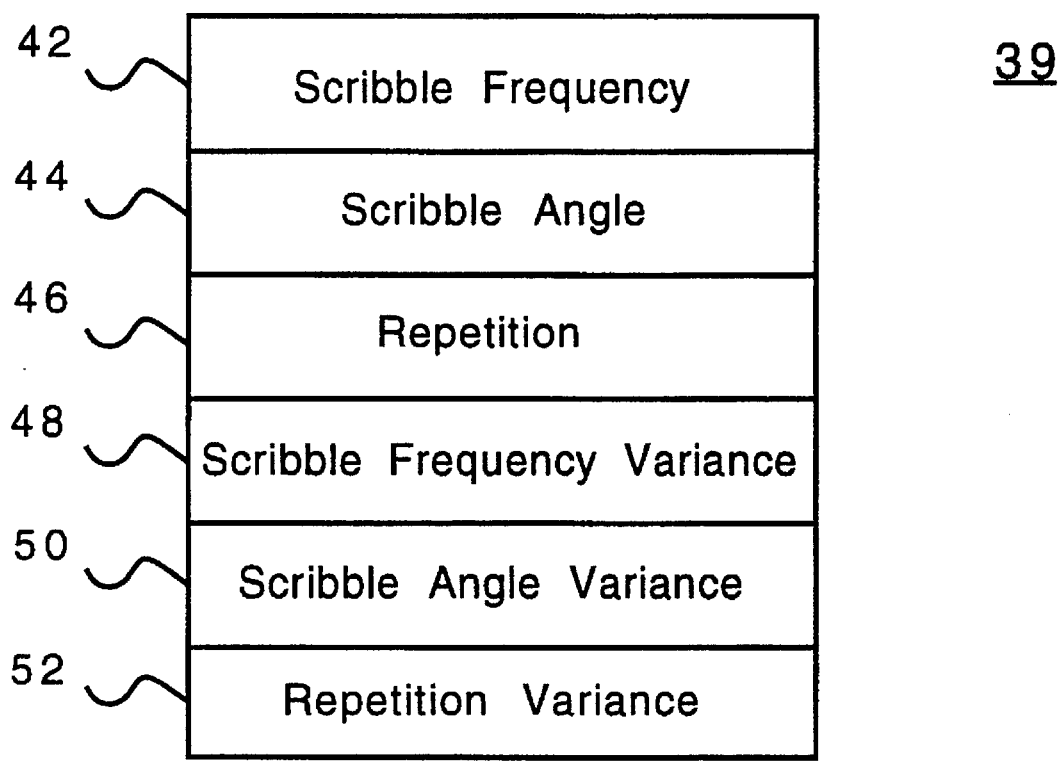
FIG. 4 is a block diagram of a memory allocation for the Scribble Fill control variables of FIG. 3.

Referring now to FIG. 4, a block diagram 39 of the scribble fill control variables memory 38 within the RAM 12 is illustrated.

The scribble fill control variables memory 38 includes memory allocation scribble frequency 42, scribble angle 44, number of repetitions 46, scribble frequency variance 48, scribble angle variance 50, and repetition variance 52. The scribble frequency memory 42 stores the frequency of intervals or gaps 117 between the horizontal lines 118 (FIG. 1C) that intersect the vector shape 116. A smaller number indicates a smaller gap 117 between each horizontal intersection line 118. A larger number for the scribble frequency memory 48 indicates a wider gap 117. The scribble frequency variance memory 48 stores a control variable indicating how much, if at all, the gaps 117 differ between each of the intersection lines 118. Thus, the scribble frequency variance memory 48 functions to randomize the control variable in the scribble frequency memory 42. The less consistent the gaps 117 are between the horizontal intersecting lines 118, the more humanistic the appearance of the finished scribbles 126, 128,130.

The scribble angle memory 44 indicates the angle of the generated scribbles 126,128,130, assuming the center of the vector shape 116 is the axis of rotation. The scribble angle variance memory 50 functions to add randomness to the control variable in the scribble angle 44. The angle of any generated scribble 126,128,130 vary about the angle stored in scribble angle memory 44 by an amount specified within the scribble angle variance memory 50. The repetitions memory 46 controls the number of times the scribble fill routines 40 are applied to an original vector shape 103. Application of the control variables stored in the scribble angle memory 44, the repetition memory 46, the scribble frequency variance memory 48, and the scribble angle variance memory 50 produce a wide variety of scribbles 126,128,130 that can be generated within the same shape 103. Finally, the repetition variance memory 52 varies the number of repetitions specified in the repetitions memory 46.

Figure 5A:
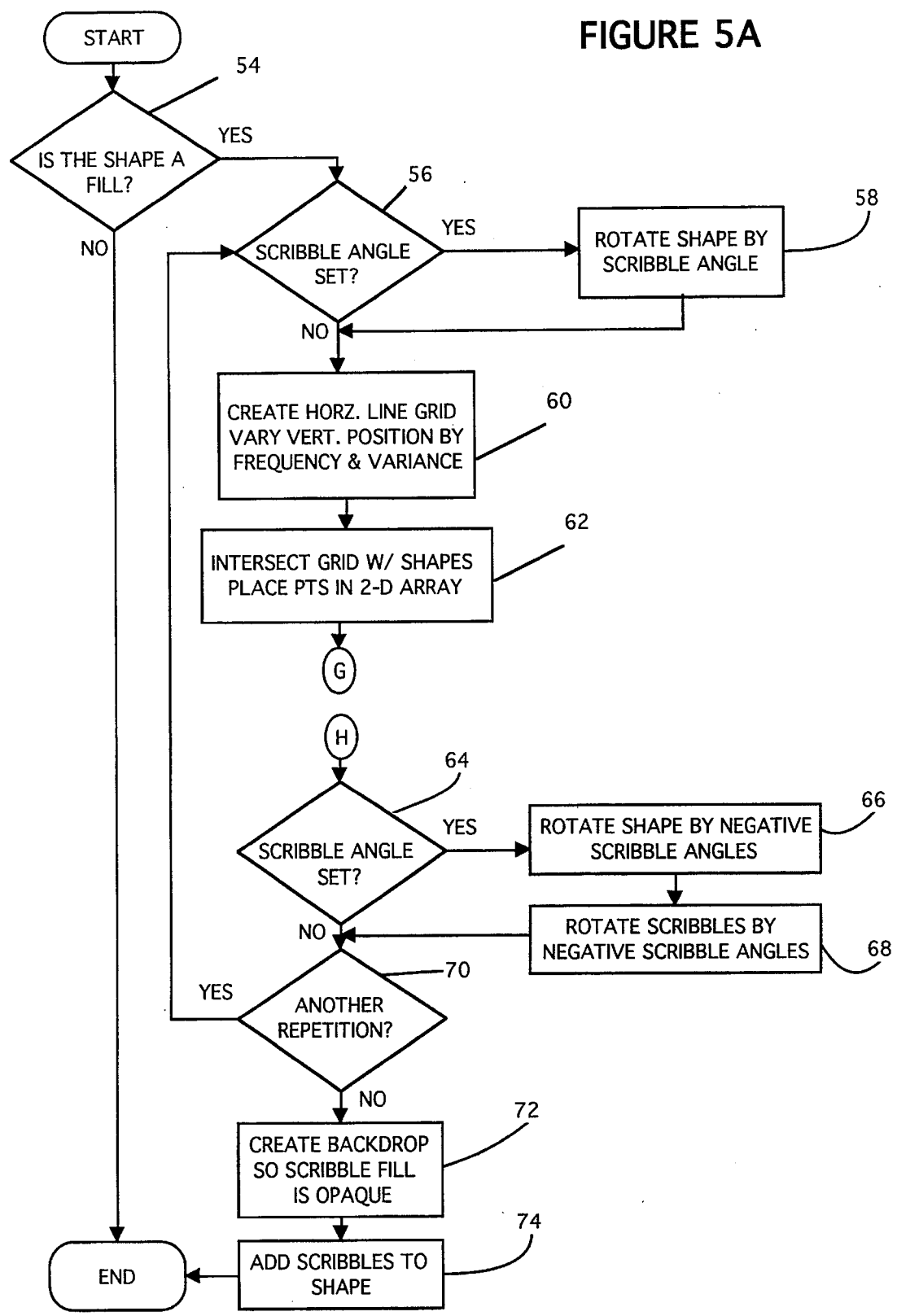
FIGS. 5A and 5B are a flowchart of the preferred Scribble Fill method according to the present invention.
Figure 5B:
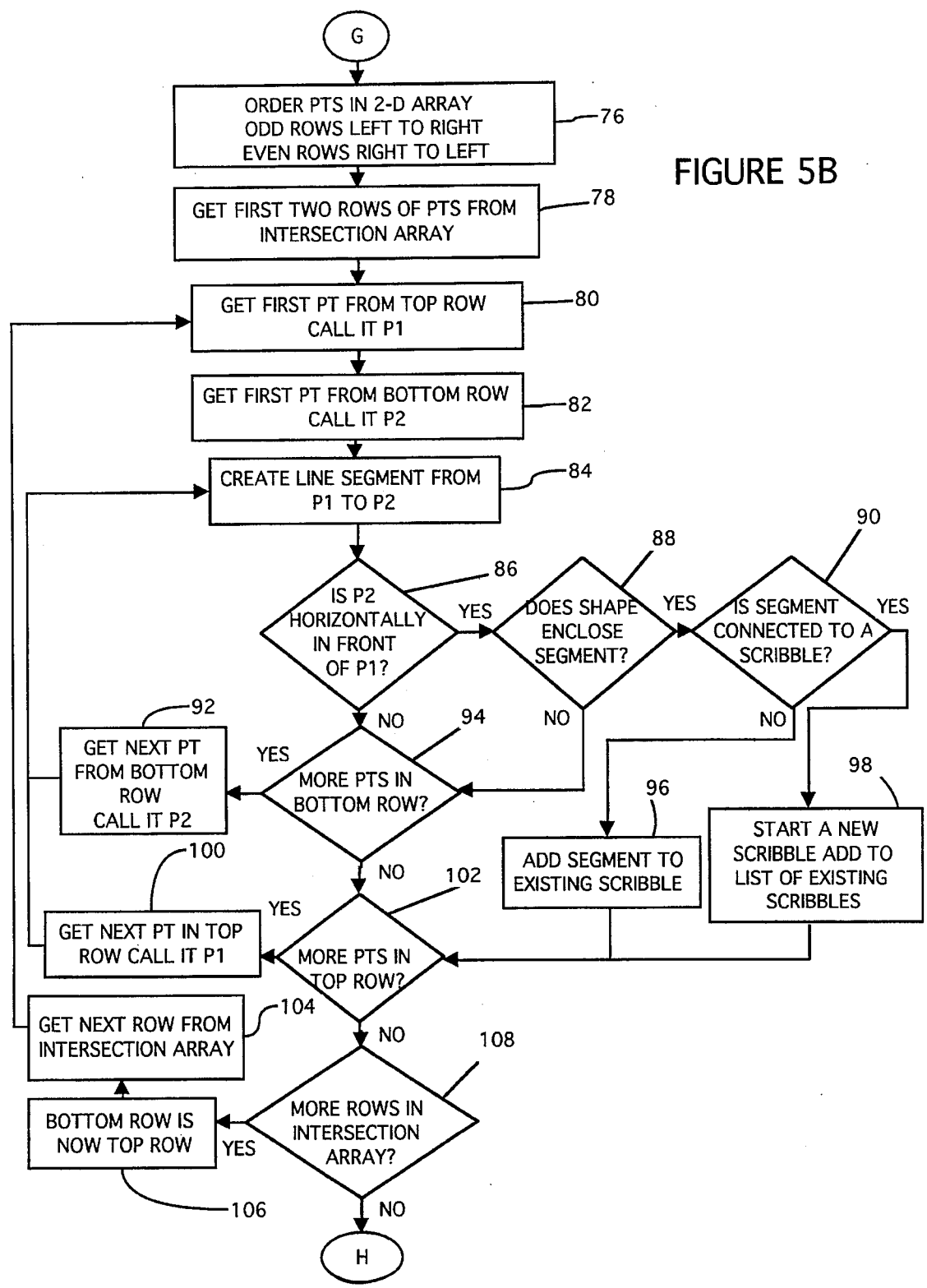

Turning now to FIGS. 5A and 5B, a flowchart illustrates a preferred method for modifying a vector shape 103 according to the present invention. Beginning at step 54, the CPU 14 of FIG. 2 reads the vector shape 103 from the vector shape database memory 30 of FIG. 3. The operating system memory 26, under the control of the scribble fill routines memory 40, verifies that the vector shape 103 is a fill shape and not a stroke shape. A fill shape has a defined boundary to be colored in, while a stroke shape defines a path to be drawn by a line. Since the scribble fill routines in memory 40 apply only to fills, stroke shapes are ignored and are bypassed. If the vector shape 103 is a fill shape, the CPU 14 at step 56 checks the scribble angle memory 44 of FIG. 4.

If the scribble angle memory 44 contains an angle of rotation, the CPU 14 proceeds to step 58 where the entire vector shape 103 is rotated to an angle defined in scribble angle memory 44 and varied by the scribble angle variance memory 50. This rotation of the vector shape 116 is illustrated in FIG. 1B. Whether or not the vector shape 103 is rotated, the CPU 14 continues to step 60 to create a series of horizontal intersection lines 118 overlaying the contours of the vector shape 116. Step 60 is illustrated in FIG. 1C. The horizontal intersection lines 118 are stored in the intersection line memory 32.

The length of the horizontal intersection lines 118 is determined by the width of the shape 116. The gap width 117 between the horizontal intersection lines 118 along a vertical plane is determined by the scribble frequency memory 42 and varied by the scribble frequency variance memory 48. At step 62, the horizontal intersection lines 118 are intersected with the vector shape 116 to create intersection points 120. FIG. 1D illustrates step 62. The intersection points 120 are stored in the two dimensional intersection array memory 34. The rows 121,123 of the intersection array 115 are arranged from top to bottom of the vector shape 116. Thus, the first row 113 of the intersection array 115 contains the intersection points 120 of the topmost 119 (FIG. 1C) horizontal intersection line 118.

At step 76 in FIG. 5B, the intersection points 120 within the intersection array 34 are ordered with the odd rows 121 (row one being the top) of the array 115 being ordered left to right. Step 76 is illustrated in FIG. 1E. The intersection points 120 within the even rows 123 are ordered right to left. Thus, the first point of the first row 113 (FIG. 1E) is the leftmost point 120. Similarly, the first point 120 of the second row 109 is the rightmost, and so on for each row within the two dimensional intersection array 115 stored in intersection array memory 34. In other words, the leftmost intersection point 120 in the first row 121 and the rightmost intersection point 120 in the second row 123 are located at alternate, opposing positions of consecutive rows 121,123. Next in step 78, the CPU 14 gets from RAM 12 the first two rows 113,107 of intersection points 120 and identifies the first two rows 113,107 as the top row and bottom row, respectfully.

In steps 80 and 82, the CPU 14 gets the first intersection point 120 from the top row 113 and the first intersection point 120 of the bottom row 107, naming those points p1 and p2, respectfully. Step 84 creates a connecting line 141 (FIG. 1G) between the points p1 and p2. In step 86, the horizontal position of p2 is compared against the horizontal position of p1. If the horizontal position of p2 is behind p1, then the method proceeds to step 94. If the horizontal position of p2 is ahead of p1, then the method proceeds to step 88. Ahead and behind are used in reference to the direction of the top row 113. For example, if the top row 113 has a direction of left to right then p2 would be ahead of p1 if p2's position was to the right of p1. Similarly, p2 would be behind p1 if p2's position was to the left of p1. If the horizontal position of p2 is ahead of p1, then the CPU 14 proceeds to step 88.

In step 88, the line p1p2 141 is checked to verify that it lies wholly within the vector shape 116. If the line p1p2 141 is not entirely within the interior of the vector shape 116, then the method proceeds to step 94. If the line p1p2 141 is completely inside the vector shape 116, then the method proceeds to step 90. At step 90, the CPU 14 checks the scribble stroke list memory 36 to see if the line p1p2 is the beginning of a new scribble 126 or a continuation of an existing scribble. A scribble 126 is simply a series of lines where the bottom point of the first line matches the top point of the second line and so on. If p1p2 is a continuation of an existing scribble 126, then the line p1p2 is attached to the end of that particular scribble 126 in the scribble stroke list memory 36 and from there the CPU 14 continues to step 102. If the line p1p2 is not a continuation of an existing scribble 126, then a new scribble 128 is started and defined by the line p1p2. The new scribble 128 is added to the scribble stroke list memory 36 and the CPU 14 continues to step102.

Returning back to step 94, if p2 is horizontally behind p1 or the line p1p2 is not entirely inside the vector shape 116, then the CPU 14 checks to see if there are any more intersection points 120 within the bottom row 109. If there are more intersection points 120, then the CPU 14 gets the next intersection point 120 from the bottom row 109 at step 92, naming this point p2. The CPU then loops back up to step 84. If, however, there are no more intersection points 120 within the bottom row 109, then the CPU 14 proceeds to step 102.

At step 102, the CPU 14 checks the top row 113 for more intersection points 120 in the top row 113, If there are more intersection points 120, the CPU 14 obtains the next intersection point 120 from the top row 113 at step 100, naming this point p1 and looping back up to step 84. If, however, there are no more intersection points 120 within the top row 113, then the CPU 14 proceeds to step 108. The two dimensional intersection array 115 is examined to see if there is another row, either and odd row 121 or and even row 123. If there is another row 121,1231, then the CPU 14 at steps 104 and 106 gets the next row 121,123 and names that row as the bottom row and renames the previous bottom row as the top row. The method then loops back to step 80 and repeats the cycle of creating p1p2 line segments, checking the line segments against the shape 116, and either discarding the line segments or adding the line segments to the scribble stroke list memory 36.

If there are no more rows 121,123 at step 108, then the CPU 14 returns back to step 64 in FIG. 5A. At step 64 the CPU 14 rechecks the scribble angle 44. If there is an angle for these scribbles 126, then at step 66 the vector shape 116 is rotated in the negative direction back to its original position, and at step 68 the scribbles 126 within the scribble stroke list memory 36 are also negatively rotated to follow the vector shape 116. Step 68 is illustrated in FIG. 1H.

Regardless of whether the scribble angle memory 44 was set, the CPU 14 continues to step 70 where the repetition memory 46, in conjunction with the repetition variance memory 52, are checked to see if another round of creating scribbles is indicated. If there are more repetitions to process, the CPU 14 loops back up to step 56 and begins the scribble process another time. If no more repetitions are required, then at step 72 the original vector fill shape color is changed to the current background color. This provides a backdrop 134 for the scribbles 126,128,130 that are added to the shape at step 74. The backdrop 134 is provided so that details underneath the original vector fill shape remain obscured. Adding the scribbles 126,128,130 to the original vector fill shape 103 forms a compound shape sometimes called a group or a picture, but still considered a distinct shape within the vector shape database memory 30. Step 74 concludes the method of applying a computer generated scribble fill to a vector shape 103.

While the invention has been described in connection with a preferred embodiment, there is no intent to limit the invention to that embodiment. On the contrary, the intent is to cover all alternatives, modifications and equivalents included within the spirit and scope of the invention as defined by the appended claims.

I claim as my invention:

1. In a computer system, a method for scribble filling a vector drawing comprising the steps of:

receiving data defining a vector shape;

creating a series of intersection lines overlaying the vector shape;

generating intersection points that indicate where the intersection lines and the vector shape intersect, the intersection lines creating an array having a row corresponding to each intersection line;

connecting, by at least one line, at least one intersection point in each row; and verifying that all the connecting lines are located within a boundary defined by the vector shape, such that said intersection lines and said connecting lines form a scribble fill for said vector shape.

2. In a computer system, a method for scribble filling a vector drawing comprising the steps of:

receiving data defining a vector shape;

creating a series of intersection lines overlaying the vector shape;

generating intersection points that indicate where the intersection lines and the vector shape intersect, the intersection lines creating an array having a row corresponding to each intersection line;

connecting, by at least one line, at least one intersection point in each row; and verifying that all the connecting lines are located within a boundary defined by the vector shape, wherein the intersection points connected by the at least one line are located at alternate, opposing positions of each consecutive row within the boundary defined by the vector shape and each connecting line remains within the boundary defined by the shape.

3. In a computer system, a method for scribble filling a vector drawing comprising the steps of:

receiving data defining a vector shape;

creating a series of intersection lines overlaying the vector shape;

generating intersection points that indicate where the intersection lines and the vector shape intersect, the intersection lines creating an array having a row corresponding to each intersection line;

connecting, by at least one line, at least one intersection point in each row; and verifying that all the connecting lines are located within a boundary defined by the vector shape, further comprising the step of reading control variables of a scribble fill control variables memory.

4. The method defined in claim 3, wherein control variables of the scribble fill control variables memory include a scribble angle.

5. The method of claim 3, wherein control variables of the scribble fill control variables memory include a scribble frequency of the intersection lines along a plane of the vector shape.

6. The method of claim 4, further comprising the step of rotating the vector shape according to the scribble angle.

7. In a computer system, a method for scribble filling a vector drawing comprising the steps of:

receiving data defining a vector shape;

creating a series of intersection lines overlaying the vector shape;

generating intersection points that indicate where the intersection lines and the vector shape intersect, the intersection lines creating an array having a row corresponding to each intersection line;

connecting, by at least one line, at least one intersection point in each row; and verifying that all the connecting lines are located within a boundary defined by the vector shape, wherein the intersection lines are parallel.

8. In a computer system, a method for scribble filling a vector drawing comprising the steps of:

receiving data defining a vector shape;

creating a series of intersection lines overlaying the vector shape;

generating intersection points that indicate where the intersection lines and the vector shape intersect, the intersection lines creating an array having a row corresponding to each intersection line;

connecting, by at least one line, at least one intersection point in each row; and verifying that all the connecting lines are located within a boundary defined by the vector shape, further comprising the step of verifying that the vector shape is a fill shape.

9. In a computer system, a method for scribble filling a vector drawing comprising the steps of:

receiving data defining a vector shape;

creating a series of intersection lines overlaying the vector shape;

generating intersection points that indicate where the intersection lines and the vector shape intersect, the intersection lines creating an array having a row corresponding to each intersection line;

connecting, by at least one line, at least one intersection point in each row; and verifying that all the connecting lines are located within a boundary defined by the vector shape, further comprising the step of regenerating connecting lines.

10. A computer system for scribble filling a vector drawing, comprising:

a processor;

an operating system memory coupled to the processor;

a vector shape database memory coupled to the processor for storing data that defines the vector shape;

a scribble fill routines memory coupled to the processor for controlling the operating system memory and the processor, said scribble fill routines memory storing a scribble fill routine to generate a scribble fill for said vector shape; and a scribble fill control variables memory coupled to the processor for storing control variables that direct the scribble fill routine stored in said scribble fill routines memory.

11. A computer system for scribble filling a vector drawing, comprising:

a processor;

an operating system memory coupled to the processor;

a vector shape database memory coupled to the processor for storing data that defines the vector shape;

a scribble fill routines memory coupled to the processor for controlling the operating system memory and the processor; and a scribble fill control variables memory coupled to the processor for storing control variables that direct the scribble fill routines memory, further comprising an intersection line memory coupled to the vector shape database memory for storing intersection lines that overlay the vector shape.

12. The computer system as defined in claim 11, further comprising an intersection point array memory coupled to the processor for storing locations where the intersection lines intersect the vector shape.

13. The computer system as defined in claim 12, further comprising a scribble stroke memory coupled to the processor for storing lines that connect intersection points.

14. The computer system as defined in claim 13, further comprising a random access memory (RAM) for storing drawing data, the RAM being coupled to the processor and further containing program instructions for causing the processor to verify that all the connecting lines are located within a boundary defined by the vector shape.

15. An apparatus for scribble filling a vector shape comprising:

means for receiving data defining a vector shape;

means for creating a series of intersection lines overlaying the vector shape;

means for generating intersection points that indicate where the intersection lines and the vector shape intersect, and the intersection points creating an array having a row corresponding to each intersection line;

means for connecting, by at least one line, at least one intersection point in each row; and means for verifying that all the connecting lines are located within a boundary defined by the vector shape, such that said intersection lines and said connecting lines form a scribble fill for said vector shape.

16. An apparatus for scribble filling a vector shape comprising:

means for receiving data defining a vector shape;

means for creating a series of intersection lines overlaying the vector shape;

means for generating intersection points that indicate where the intersection lines and the vector shape intersect, and the intersection points creating an array having a row corresponding to each intersection line;

means for connecting, by at least one line, at least one intersection point in each row; and means for verifying that all the connecting lines are located within a boundary defined by the vector shape, wherein the intersection points connected by the at least one line are located at alternate, opposing positions of each consecutive row within the boundary defined by the vector shape and each connecting line remains within the boundary defined by the shape.

17. An apparatus for scribble filling a vector shape comprising:

means for receiving data defining a vector shape;

means for creating a series of intersection lines overlaying the vector shape;

means for generating intersection points that indicate where the intersection lines and the vector shape intersect, and the intersection points creating an array having a row corresponding to each intersection line;

means for connecting, by at least one line, at least one intersection point in each row; and means for verifying that all the connecting lines are located within a boundary defined by the vector shape, further comprising means for reading contents of a scribble fill control variables memory.

18. The apparatus defined in claim 17, wherein the scribble fill control variables memory includes a scribble angle.

19. The apparatus defined in claim 18, wherein the scribbles fill control variables memory includes a scribble frequency of the intersection lines along a plane of the vector shape.

20. The apparatus defined in claim 18, further comprising means for rotating the vector shape according to the scribble angle.

21. A computer usable medium having computer readable program code means embodied therein for causing a computer to perform the steps of:

receiving data defining a vector shape;

creating a series of intersection lines overlaying the vector shape;

generating intersection points that indicate where the intersection lines and the vector shape intersect, the intersection lines creating an array having a row corresponding to each intersection line;

connecting, by at least one line, at least one intersection point in each row; and verifying that all the connecting lines are located within a boundary defined by the vector shape, such that said intersection lines and said connecting lines form a scribble fill for said vector shape.

* * * * *